United States Patent
Wilson et al.

(10) Patent No.: US 10,209,992 B2
(45) Date of Patent: Feb. 19, 2019

(54) SYSTEM AND METHOD FOR BRANCH PREDICTION USING TWO BRANCH HISTORY TABLES AND PRESETTING A GLOBAL BRANCH HISTORY REGISTER

(71) Applicant: Avago Technologies International Sales Pte. Limited, Singapore (SG)

(72) Inventors: Sophie Wilson, Cambridge (GB); Geoffrey Barrett, Bristol (GB)

(73) Assignee: Avago Technologies International Sales Pte. Limited, Singapore (SG)

( * ) Notice: Subject to any disclaimer, the term of this patent is extended or adjusted under 35 U.S.C. 154(b) by 642 days.

(21) Appl. No.: 14/530,038

(22) Filed: Oct. 31, 2014

(65) Prior Publication Data
US 2015/0309794 A1 Oct. 29, 2015

Related U.S. Application Data

(60) Provisional application No. 61/984,711, filed on Apr. 25, 2014.

(51) Int. Cl.
*G06F 9/38* (2018.01)

(52) U.S. Cl.
CPC .......... *G06F 9/3806* (2013.01); *G06F 9/3844* (2013.01); *G06F 9/3848* (2013.01)

(58) Field of Classification Search
CPC ..... G06F 9/3806; G06F 9/3844; G06F 9/3848
See application file for complete search history.

(56) References Cited

U.S. PATENT DOCUMENTS

| | | | |
|---|---|---|---|
| 5,634,026 A | 5/1997 | Heaslip et al. | |
| 5,881,262 A | 3/1999 | Abramson et al. | |
| 5,996,063 A | 11/1999 | Gaertner et al. | |
| 6,240,509 B1 | 5/2001 | Akkary | |
| 6,370,637 B1 | 4/2002 | Meier et al. | |
| 6,658,621 B1 * | 12/2003 | Jamil | G06F 9/3836 712/34 |
| 7,043,626 B1 | 5/2006 | McMinn et al. | |
| 7,069,411 B1 | 6/2006 | McMinn et al. | |

(Continued)

FOREIGN PATENT DOCUMENTS

| | | |
|---|---|---|
| CN | 1114763 A | 1/1996 |
| EP | 0863460 A2 | 9/1998 |

(Continued)

OTHER PUBLICATIONS

Choi et al, Accurate branch prediction for short threads, 2008, ACM, 978-1-59593-958-6/08/03, 10 pages.*

(Continued)

*Primary Examiner* — Jyoti Mehta
(74) *Attorney, Agent, or Firm* — Sterne, Kessler, Goldstein & Fox P.L.L.C.

(57) ABSTRACT

A method and system for branch prediction are provided herein. The method includes executing a program, wherein the program comprising multiple procedures, and setting bits in a taken branch history register to indicate whether a branch is taken or not taken during execution of instructions in the program. The method further includes the steps of calling a procedure in the program and overwriting, responsive to calling the procedure, the contents of the taken branch history register to a start address for the procedure.

21 Claims, 8 Drawing Sheets

(56) References Cited

U.S. PATENT DOCUMENTS

| | | | |
|---|---|---|---|
| 7,856,548 B1* | 12/2010 | Nelson | G06F 9/3832 712/220 |
| 8,019,981 B1 | 9/2011 | Metzgen | |
| 2002/0194463 A1 | 12/2002 | Glenn et al. | |
| 2009/0198917 A1 | 8/2009 | Arimilli et al. | |
| 2012/0226894 A1 | 9/2012 | Seki | |
| 2013/0055256 A1 | 2/2013 | Banga et al. | |
| 2013/0086210 A1 | 4/2013 | Yiu et al. | |
| 2013/0086211 A1 | 4/2013 | Sondhi et al. | |
| 2013/0219176 A1 | 8/2013 | Akella et al. | |
| 2013/0275492 A1 | 10/2013 | Kaufman et al. | |
| 2014/0025832 A1 | 1/2014 | Ito | |

FOREIGN PATENT DOCUMENTS

| | | |
|---|---|---|
| EP | 1569112 A2 | 8/2005 |
| WO | WO 2013071087 A1 | 5/2013 |
| WO | WO 2013126570 A1 | 8/2013 |

OTHER PUBLICATIONS

Yeh et al, A comparison of dynamic branch predictors that use two levels of branch history, 1993, IEEE, 0884-7495/93, 10 pages.*

Program Flow Instructions, Nov. 6, 2003, 3 pages, [retrieved from the internet on Apr. 4, 2017], retrieved from URL <www.csc.depauw.edu/~bhoward/asmtut/asmtut8.html>.*

European Office Action directed to related European Application No. 15164990.2, dated Sep. 27, 2016; 7 pages.

European Search Report directed to related European Application No. 15163477.1, dated Jul. 15, 2015; 5 pages.

European Search Report directed to related European Application No. 15164988.6, dated Sep. 24, 2015; 10 pages.

International Preliminary Report on Patentability directed to related International Application No. PCT/RU2014/000677, dated Aug. 9, 2016; 9 pages.

International Preliminary Report on Patentability directed to related International Application No. PCT/US2014/053747, dated Aug. 9, 2016; 13 pages.

International Preliminary Report on Patentability directed to related International Application No. PCT/US2014/056154, dated. Sep. 17, 2014; 28 pages.

Chanliau, "Oracle Enterprise Gateway Securing SOA and Web Services with Oracle Enterprise Gateway," Apr. 30, 2011; retrieved from the Internet: http://www.oracle.com/technetwork/middleware/id-mgmt/oeg-tech-wp-apr-2011-345875.pdf [retrieved on Dec. 6, 2016]. 22 pages.

Evers, M., *Improving Branch Prediction by Understanding Branch Behavior*, Dissertation submitted to The University of Michigan, Copyright 2000, pp. i-x and 1-150.

Porter, L. et al., "Creating Artificial Global History to Improve Branch Prediction Accuracy," *ICS '09*, Jun. 8-12, 2009, Yorktown Heights, New York, USA, 10 pages.

English translation of Second Office Action, dated Dec. 18, 2017, for Chinese Patent Appl. No. 201510203229.X, 14 pages.

* cited by examiner

US 10,209,992 B2

SYSTEM AND METHOD FOR BRANCH PREDICTION USING TWO BRANCH HISTORY TABLES AND PRESETTING A GLOBAL BRANCH HISTORY REGISTER

BACKGROUND OF THE INVENTION

Field of the Invention

This application generally relates to branch predictors.

Background Art

Branch predictors are used to predict whether a branch will be taken or not taken. Accuracy of the prediction improves performance of a processor. Methods and systems are provided herein to improve the accuracy of a branch predictor.

BRIEF DESCRIPTION OF THE DRAWINGS/FIGURES

Embodiments of the disclosure are described with reference to the accompanying drawings. In the drawings, like reference numbers indicate identical or functionally similar elements. Additionally, the left most digit(s) of a reference number identifies the drawing in which the reference number first appears.

DETAILED DESCRIPTION OF THE INVENTION

Figure 1:
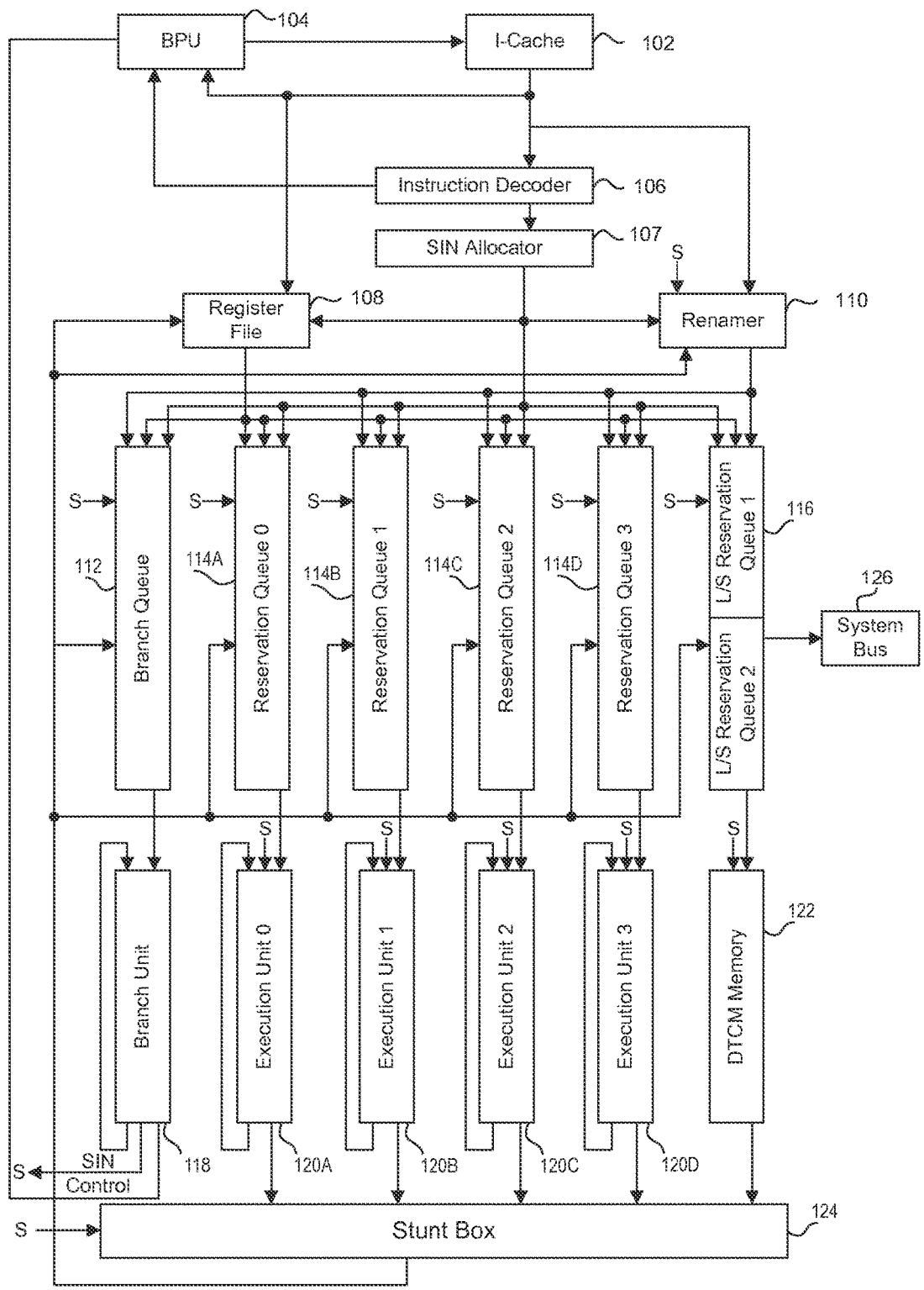
FIG. 1 is a high-level block diagram illustrating the major blocks of an exemplary processor in accordance with the disclosure.

The following Detailed Description refers to accompanying drawings to illustrate exemplary embodiments consistent with the disclosure herein. References in the Detailed Description to "one exemplary embodiment," "an illustrative embodiment", "an example embodiment," and so on, indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure herein. Therefore, the Detailed Description is not meant to limit the disclosure. Rather, the scope of the disclosure is defined only in accordance with the following claims and their equivalents.

The following Detailed Description of the exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Terminology

The terms, chip, die, integrated circuit, semiconductor device, and microelectronic device, are often used interchangeably in the field of electronics.

FET, as used herein, refers to metal-oxide-semiconductor field effect transistors (MOSFETs). An n-channel FET is referred to herein as an NFET. A p-channel FET is referred to herein as a PFET.

CMOS is an acronym that stands for Complementary Metal Oxide Semiconductor, and refers to a semiconductor manufacturing process in which both NFETs are PFETs are formed in the same chip.

CMOS circuit refers to a circuit in which both NFETs and PFETs are used together.

SoC is an acronym that stands for System on a Chip, and refers to a chip that includes two or more circuit blocks, typically interconnected by a bus, where those circuit blocks provide such high levels of functionality that these blocks would have been considered system-level components in the past. By way of example, circuit blocks having the requisite level of functionality as of this date include scalar, superscalar, and very long instruction word processors; DRAM controllers (e.g., DDR3, DDR4 and DDR5); flash memory controllers; Universal Serial Bus (USB) controllers; and the like. This list is intended to be illustrative and not limiting. Another common way of describing an SoC is a chip that includes all the components that would be needed to implement an electronic system such as, for example, a computer system or a computer-based system.

VLIW is an acronym for Very Long Instruction Word.

VLIW instruction, as used in the description of exemplary embodiments herein, refers to a set of instructions grouped together for presentation to the instruction decoder. The individual instructions in the set of instructions are assigned to one of a plurality of execution pipes for execution.

IC0 refers to a pseudo-stage which is on the input to the instruction cache.

IC1 refers to the instruction cache stage. Fetch requests to the instruction cache are made in this cycle, along with calculations to determine which PC to fetch next. VLIW instructions previously requested are supplied in this stage.

DE1 refers to the first stage of the instruction decoder.

DE1_operation refers to a logical operation performed by the first stage of the instruction decoder.

DE1_time refers to a cycle in which a DE_1 operation occurs.

DE2 refers to the second stage of the instruction decoder.

DE2_operation refers to a logical operation performed by the second stage of the instruction decoder.

DE2_time refers to the cycle in which the reading and renaming of the general register file (GRF) and predicate register file (PREG) occurs.

RS refers to a reservation station. There are several different reservation stations that can be enqueued to. In the best case this is a single cycle stage, however operations may end up queuing here for many cycles.

EXn refers to an nth stage of an execution pipe. Examples of execution pipes include ALU short and long pipes, BRANCH and the Load Store Unit.

SHP refers to a short execution pipe. A short execution pipe is used to perform single cycle operations.

LOP refers to a long execution pipe. A long execution pipe is used to execute instructions that take 2-8 cycles to complete.

LSU refers to the load store unit.

DTCM refers to a data tightly coupled memory.

PBUS refers to a bus that connects to a peripheral memory.

DCACHE refers to the data cache used to cache accesses to peripheral memory.

Enqueue refers to the action in which a VLIW instruction in DE2 is split into its component operations and then move forward down the pipe into the reservation stations.

Issue refers to moving an operation from the reservation station to an execution unit. An operation is referred to as being issued when it is moved from the reservation station to an execution unit. An operation is a component part of a VLIW instruction.

Current PC refers to the value of the program counter (PC) for the instruction currently in a given stage. Each stage of the pipe will have its own version of the current PC.

Next PC refers to the next PC to fetch from the Icache. For straight line code this will be current PC+ current instruction width, for redirected code it will be the new target PC.

Loop start address refers to the address of the first instruction in a loop body, i.e., the address to branch to for starting a new loop iteration.

Loop end address refers to the address of the first instruction after a loop body, i.e., the address to branch to for naturally exiting the loop.

Loop body refers to the instructions beginning with the loop start address and ending with the loop match address.

Loop match address refers to the address of the last instruction in a loop body.

Loop count refers to the number of iterations of the loop that should be executed. This comes from either an immediate field for LOOP operations, or a general register for ZLOOP and ZLOOPS operations.

SIN refers to the Speculation Index Number, which is used to identify instructions enqueued speculatively in the shadow of a branch.

SIN resolution refers to determining whether a branch was correctly speculated or not. SIN resolution is performed in EX1.

SIN validation refers to a branch in EX1 that was correctly speculated, which in turn will validate the SIN associated with the operations in the shadow of the correctly speculated branch. A validated operation is one which will update the architectural state.

SIN cancellation refers to a branch in EX1 that was incorrectly speculated, which in turn will cancel all outstanding SINs, and perform an EX1 redirect, effectively removing all operations that were in the shadow of the branch it from the execution pipe. In one embodiment, removing the operation that were in the shadow of the incorrectly speculated branch includes changing the state of a bit associated with each of those instruction in the execution pipe.

State coherency enforcement (SCE) refers to actions performed by an internal mechanism to prevent future operations from seeing an incoherent machine state.

Trap events refers to the set of synchronous, asynchronous and fault events.

Synchronous trap events relate to a specific instruction and are detected in time to prevent the instruction causing the event from being enqueued. The Supervisor Call (SVC) instruction fits into this category. These are precise as they occur in an architecturally defined place in the instruction stream.

Asynchronous trap events (interrupts) occur independently from the current instruction sequence. Asynchronous exceptions fit into this.

Fault trap events prevent program flow from recovering. Examples of fault trap events are a misaligned PC and a data abort. Faulting operations with a register destination must complete a register value.

A processor architecture is disclosed that includes a register file having a plurality of registers, and is configured for out-of-order instruction execution, further includes a renamer unit that produces generation numbers that are associated with register file addresses to provide a renamed version of a register that is temporally offset from an existing version of that register rather than assigning a non-programmer-visible physical register as the renamed register. The processor architecture may include a reset dual history length (DHL) Gshare branch prediction unit coupled to an instruction cache and configured to provide speculative addresses to the instruction cache. The processor architecture is suitable for implementation in an integrated circuit. Such an integrated circuit is typically implemented with CMOS circuitry.

In typical embodiments a processor in accordance with this disclosure is implemented in an integrated circuits as an embedded processor.

FIG. 1 is a high-level block diagram illustrating the major blocks of an exemplary processor in accordance with the disclosure. The exemplary processor includes an instruction cache 102 coupled to receive a VLIW instruction address from a branch prediction unit 104, and further coupled to provide an output to branch prediction unit 104, an instruction decoder 106, a register file 108, and a generation renamer 110. Generation renamer 110 is coupled to branch execution unit 118 to receive a SIN control signal, coupled to the SIN Allocator to receive a SIN number, coupled to a stunt box 124 to receive an output from an operand copy network, and coupled to the branch reservation queue 112, execution pipe reservation queues 114A, 114B, 114C, 114D, and load/store reservation queue 116. Register file 108 is coupled to stunt box 124 to receive input from the operand copy network, and is further coupled to the branch reservation queue 112, execution pipe reservation queues 114A, 114B, 114C, 114D, and load/store reservation queue 116. Branch reservation queue 112 is coupled to branch execution unit 118. Execution pipe reservation queues 114A, 114B, 114C, 114D are each respectively coupled to corresponding execution pipes 120A, 120B, 120C, and 120D. Execution pipes 120A, 120B, 120C, and 120D are each coupled to provide output to stunt box 124. Each of execution pipes 120A, 120B, 120C, and 120D are respectively coupled to provide their output back to their inputs, and each is further coupled to the output of branch execution unit 118 to receive the SIN control signal. A memory 122 is coupled to the load/store unit 116. And load/store unit 116 is further coupled to a system bus 126.

Instruction cache 102 holds VLIW instructions that have been previously fetched by an instruction fetch unit (not shown). The VLIW instructions are typically fetched from a memory disposed external to the processor itself. Branch prediction unit 104 is shown coupled to instruction cache 102. Branch prediction unit 104 provides the address of the VLIW instruction to fetch. If the requested VLIW instruction is present in instruction cache 102 then it is provided to an instruction decoder 106. If the requested VLIW instruction is not present in instruction cache 102 then a cache miss has occurred and the requested instruction is fetched from a memory that is disposed outside of the processor.

Branch prediction unit 104 has several functions, including providing the program counter value needed by instruction cache 102, and the program counter value needed by different stages and logic blocks throughout the processor. For sequentially executing program code, the program counter value simply changes by the length of the instruction just fetched. But when a branch instruction is detected, then branch prediction unit 104 determines from what address the next instruction should be fetched. In this exemplary processor, branch prediction unit 104 uses a small reset DHL Gshare branch prediction mechanism to determine the next instruction address.

Instruction decoder 106 decodes the content of the VLIW instructions and provides control information to various other blocks of the processor.

Register file 108 contains a predetermined number of programmer-visible registers. These registers hold values that are used during the execution of a program.

Individual instructions obtained from the VLIW instruction are enqueued into a selected reservation queue. When the operands needed for execution of an enqueued instruction become available, that instruction is issued to the execution pipe associated with the selected reservation queue.

Generation renamer 110 is used to assign generation numbers to register instances in instructions when those register instances would conventionally be reassigned to a different non-programmer-visible physical register.

The reservation queues hold instructions that are waiting to be issued.

Stunt box 124 provides a mechanism for receiving and distributing the outputs of the execution pipes. Stunt box 124 provides data to an operand copy network. The operand copy network allows all the results of the execution pipes to be made available to other blocks within the processor. In this way, an instruction waiting for an operand to be produced from the execution of another instruction does not have to wait for that operand to be written back to the register file and then read out of the register file. Rather the required operand is made available, via the operand copy network, to all the locations throughout the processor that are waiting for that particular result.

System bus 126 provides a mechanism for the embedded processor to communicate with other logic blocks on the integrated circuit that are external to the processor itself.

Branches and Branch Prediction

Branch instructions are used to choose which path to follow through a program. Branches can be used to jump to a procedure in different places in a program. They can also be used to allow a loop body to be executed repeatedly, and they can be used to execute a piece of code only if some condition is met.

Branches cause problems for processors for two reasons. Branches can change the flow through the program, so the next instruction is not always the instruction following sequentially after the branch. Branches can also be conditional, so it is not known until the branch is executed whether the next instruction to be fetched is the next sequential instruction or the instruction at the branch target address.

In early processor designs, instructions were fetched and executed one at a time. By the time the fetch of a new instruction stared, the target address and condition of a previous branch was already known. The processor always knew which instruction to fetch next. However, in pipelined processors, the execution of several instructions is overlapped. In a pipelined processor, the instruction following the branch needs to be fetched before the branch is executed. However, the address of the next instruction to fetch is not yet known. This problem may be referred to as the branch problem. Since the target address and condition of the branch are not known until after the branch is executed, all pipeline stages before the execute stage will be filled with bubbles or no-operations by the time the branch is ready to execute. If an instruction executes in an $n^{th}$ stage of a pipeline, there will be (n−1) bubbles or no-operations per branch. Each of the bubbles or no-operations represents the lost opportunity to execute an instruction.

In superscalar processors, the branch problem is more serious as there are two or more pipelines. For a superscalar processor capable of executing k instructions per cycle, the number of bubbles or no-operations is (n−1)×k. Each bubble still represents the lost opportunity to execute an instruction. The number of cycles lost due to each branch is the same in the pipelined and superscalar processors, but the superscalar processor can do much more in that period of time. For example, consider a 4-issue superscalar (i.e., k=4) processor where branches are executed in the nth pipeline stage (with n=6). If every fifth instruction is a branch instruction, there will be 20 bubbles for every 5 useful instructions executed. Due to the branch problem, only 20% of the execution bandwidth is used to execute instructions. The trend in processor design is towards wider issue and deeper pipelines, which further aggravates the branch problem.

Branch prediction is one way of dealing with the branch problem. A branch predictor predicts whether a branch will be taken or not taken. The predictor uses the prediction to decide what address to fetch the next instruction from in the next cycle. If the branch is predicted as taken, then an instruction at the branch target address will be fetched. If the branch is predicted as not taken, then the next sequential instruction after the branch instruction will be fetched. When a branch predictor is used, a branch penalty is only seen if the branch is mispredicted. A highly accurate branch predictor is therefore an important mechanism for reducing the branch penalty in a processor.

Figure 2:
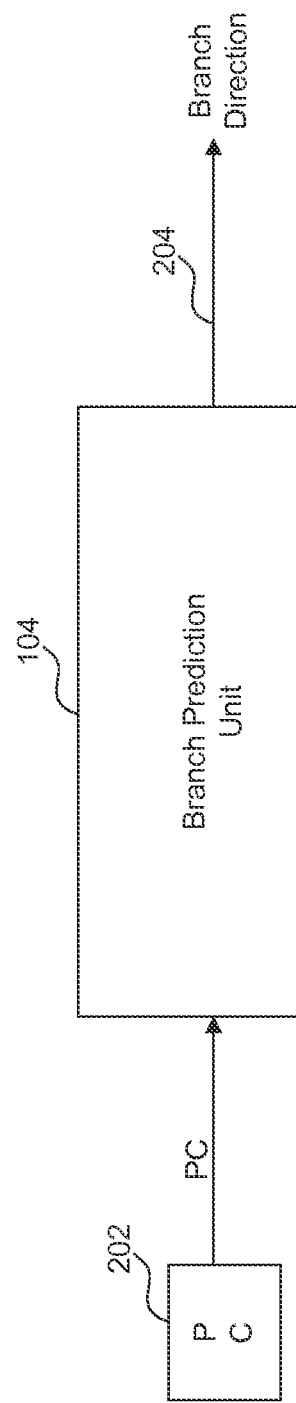
FIG. 2 illustrates an example branch prediction unit according to an embodiment of the disclosure.

FIG. 2 illustrates an example branch prediction unit 104 according to an embodiment of the disclosure.

FIG. 2 illustrates a program counter register 200 coupled to the branch prediction unit. Program counter register 202 provides a current Program Counter (PC) value. Current PC refers to the value of the program counter (PC) for the instruction currently in a given stage. Each stage of the pipe will have its own version of the current PC. Next PC refers to an address of a next instruction to be fetched from the Icache 102. For straight line code the Next PC will be current PC+ current instruction width, for redirected code it will be the new target PC. It is to be appreciated that another source besides the program counter register 200 may be used to provide an address of the next instruction to be fetched. Branch prediction unit 104 generates a branch direction signal 204 based on the Next PC. Branch direction signal 204 indicates whether a branch will be taken or not taken.

Figure 3:
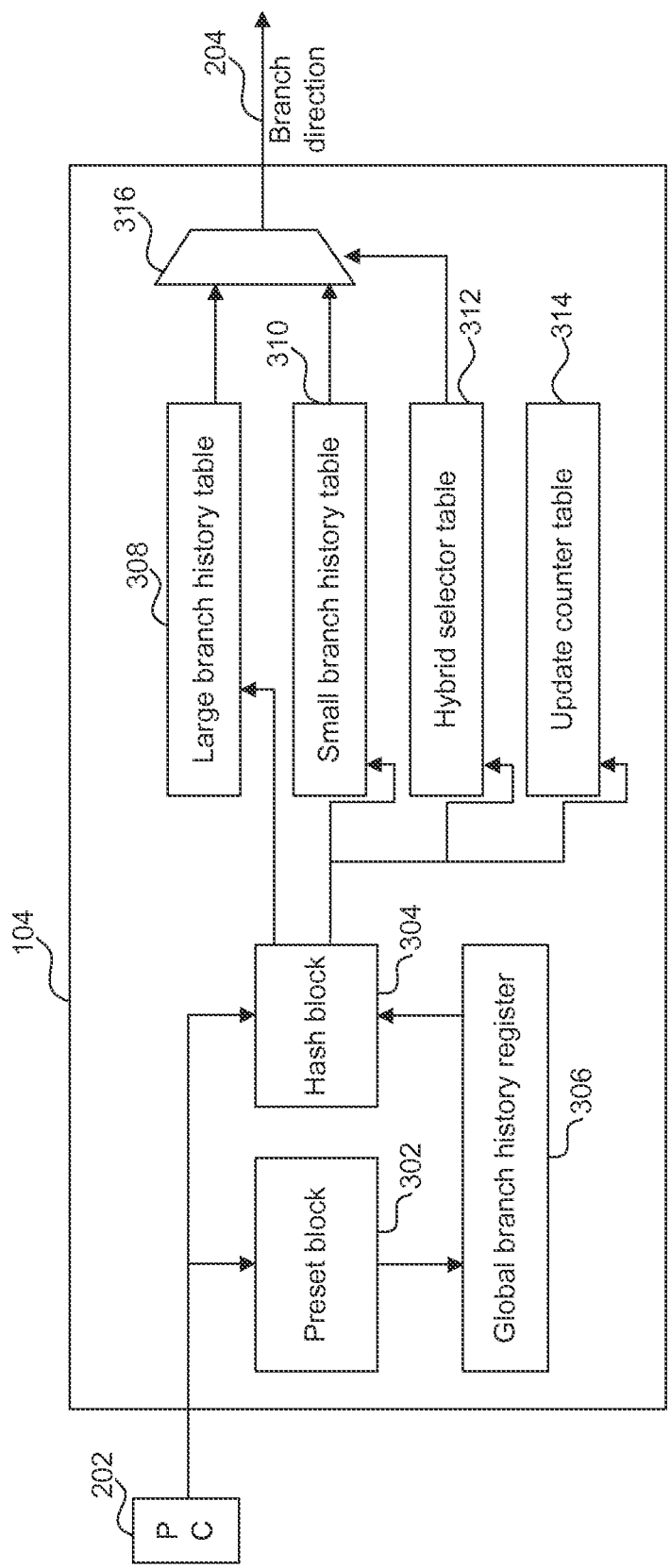
FIG. 3 illustrates the branch prediction unit in further detail according to an embodiment of the disclosure.

FIG. 3 illustrates the branch prediction unit 104 in further detail according to an embodiment of the disclosure. Branch prediction unit 104 includes a preset block 302, a hash block 304, a global branch history register 306, a large branch history table 308, a small branch history table 310, a hybrid selector table 312, an update counter 314, and a multiplexer (mux) 316. Preset block 302 and hash block 304 are coupled to global branch history register 306. Hash block 304 is also coupled to large branch history table 308, small branch history table 310, hybrid selector table 312, and update counter table 314. Large branch history table 308, small branch table 310, and hybrid selector 312 are coupled to mux 316.

Global branch history register 306 stores bits that indicate whether a branch was taken during execution of instructions in a program. Hash block 304 generates addresses to access entries in the large branch history table 308, small branch history table 310, hybrid selector table 312, and update counter table 314. Generation of addresses using hash block 304 to access entries in the large branch history table 308 is further described below with respect to FIG. 6. Generation of addresses using hash block 304 to access the entries in the small branch history table 310, the hybrid selector table 312, and the update counter table 314 is further described below with respect to FIG. 7.

A conventional branch predictor may use only one branch history table. Embodiments presented herein use two branch history tables, the large branch history table 308 and the small branch history table 310. Both the small branch history table 310 and the large branch history table 308 store values that predict a branch direction for a branch in a program code being executed. The small branch history table 310 has fewer entries than the large branch history table 308, and is therefore a shorter history that is better at capturing correlation between branches for which only the most recent branch outcomes are needed. The large branch history table 308 has more entries than the small branch history table and the longer history captures more complex correlations between branches. The state machine to update values in large branch history table 308 and small branch history table 310 is described below with respect to FIG. 8.

Mux 316 selects between a branch direction read from the large branch history table 308 and the small branch history table 310 based on a selection value read from an entry in the hybrid selector table 312. Each fetched branch is mapped to an entry in the large branch history table 308, the small branch history table 310, and a selection entry in the hybrid selector table 312 using the hash block 304. If the selection entry in the hybrid selector table 312 has a value greater than or equal to 2, then the prediction from the large branch history table 308 is used to predict the direction of the branch, otherwise, the prediction from the small branch history table 310 is used. A value in a selection entry in hybrid selector table 312 corresponding to a branch is incremented if only the large branch history table 308 was correct in predicting that branch. If only the small branch history table 310 was correct in predicting that branch, the value in the selection entry in the hybrid selector table 314 corresponding to that branch is decremented. If both the large branch history table 308 and the small branch history table 310 made the same prediction for the branch, the value in the selection entry is not changed.

The update counter table 314 is used to determine whether to inhibit an update of an entry in the large branch history table 308. Update counter table 314 stores an update value in each entry. The update value indicates whether the large branch history table 308 or the small branch history table 310 is more accurate in a prediction of a particular branch. According to an embodiment of the disclosure, the value in a large branch history table 308 corresponding to a branch instruction is not updated if the corresponding update value in update counter table 314 indicates that the small branch history table 310 is more accurate than the large branch history table 308 in a prediction of a branch direction for the branch. If an update value corresponding to a particular branch in the update counter table 314 is zero, then update of the large branch history table 308 is inhibited regardless of whether the particular branch is correctly predicted by the large branch history table 308 or the small branch history table 310, otherwise the update is allowed. When the small branch history table 310 mispredicts a particular branch, the update value corresponding to the particular branch in the update counter table 314 is set to 3. Every time thereafter, the update value corresponding to that particular branch is decremented if the large branch history table 308 mispredicts the particular branch. In this manner, the large branch history table 308 is only updated with the correct prediction for the particular branch when the small branch history table 308 has recently mispredicted the particular branch. This prevents over-updating of the large branch history table 308 leading to better training of the large branch history table 308 with regard to the particular branch.

Figure 4:
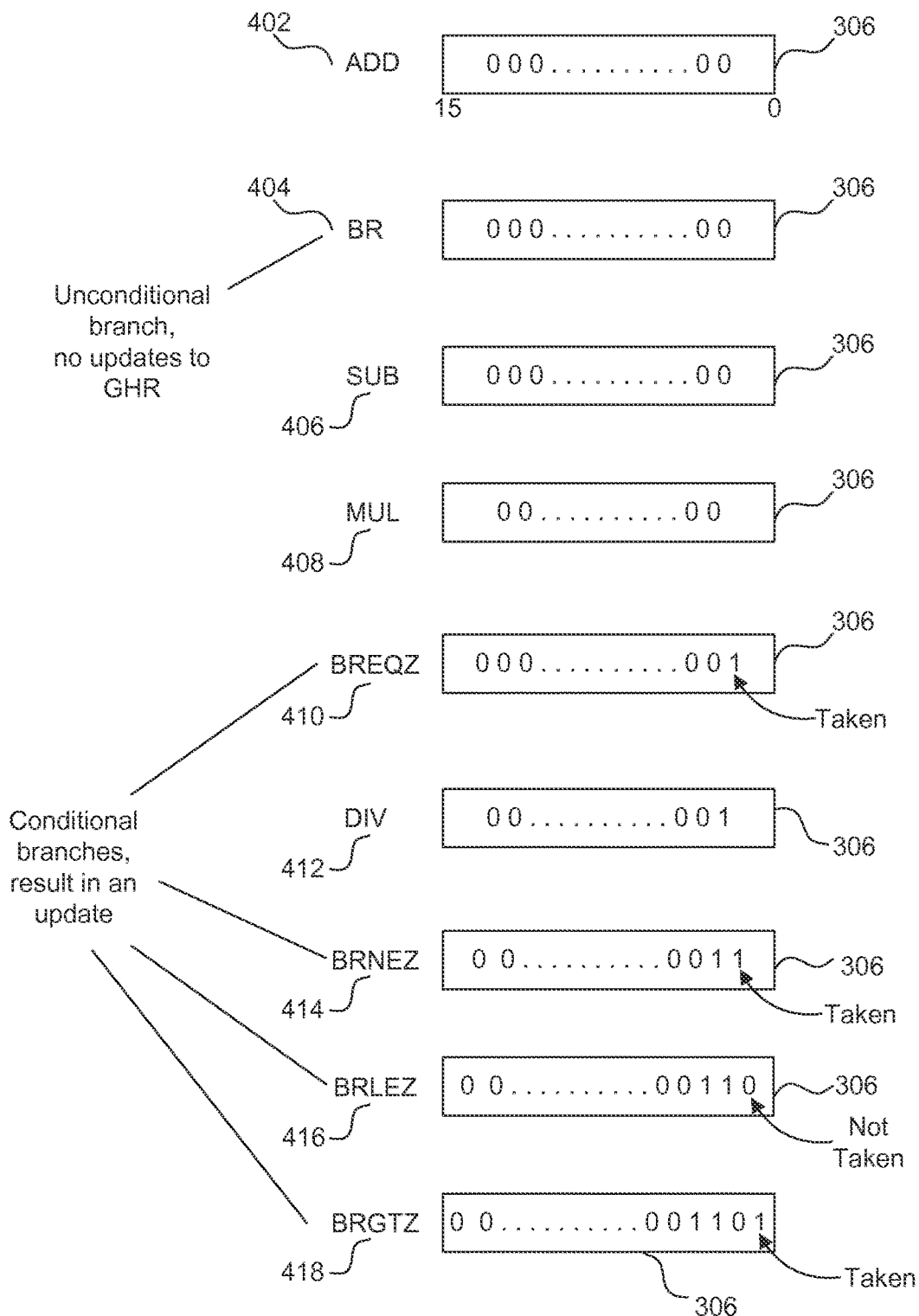
FIG. 4 illustrates example updates of a global branch history register according to an embodiment of the disclosure.

FIG. 4 illustrates an example to update global branch history register 306 according to an embodiment of the disclosure. FIG. 4 shows different instructions and the resulting updates in global branch history register 306 when the instructions are fetched. In an example, global branch history register 306 may be initialized to store all zeros upon startup. In another example, global branch history register may store a random value upon startup. Global branch history register 306 is updated only for conditional branch instructions. A conditional branch instruction is, for example, a branch instruction that jumps to an address based on whether a condition is true or false. A branch if equal to zero (BREQZ) instruction, a branch if not equal to zero (BRNEZ) instruction, a branch if less than or equal to zero instruction (BRLEZ), and a branch if greater than zero (BRGTZ) instruction are examples of conditional branch instructions. Unconditional branch instructions are branch instructions that always transition program execution to an address of an instruction specified in the branch instruction. For example, BR X is an unconditional branch instruction that will transition program execution to an instruction stored at address X. Global branch history register 306 is also not updated for instructions that are not conditional branches such as addition (ADD) instructions, subtract (SUB) instructions, multiply (MUL) instructions, divide (DIV) instruction, load (LD), or store (ST) instructions. When an instruction, for example, an ADD instruction 402 is fetched, there will be no change made to the global branch history register 306 since it is not a conditional branch instruction. Therefore, fetching of any arithmetic, load, store, or unconditional branch instruction will not update the global branch history register 306.

Referring back to FIG. 4, upon receiving BR instruction 404, global branch history register 306 is again not updated because BR instruction 404 is not a conditional branch instruction. When SUB instruction 406 and MUL instruction 408 are fetched, again global branch history register 306 is not updated. Upon receiving a conditional branch instruction BREQZ 410, the global branch history register 306 will be updated. In this example, assuming the BREQZ instruction 410 is predicted as being taken, then global branch history register 306 is updated by shifting a bit "1" into the least significant bit position of global branch history register 306 to indicate that it is taken. In an embodiment, if the prediction is determined to be incorrect when the BREQZ instruction 410 is later resolved by executing it in branch unit 118, then global branch history register 306 is updated with the correct prediction of the BREQZ instruction 410.

Upon fetching the DIV instruction 412, global branch history register 306 is again not updated since the DIV 412 instruction is not a conditional branch instruction. Upon receiving the BRNEZ instruction 414, the global branch history register 306 will be updated since the BRNEZ instruction 414 is a conditional branch instruction. Assuming the BRNEZ instruction 414 is predicted as taken, the global branch history register 306 is updated by shifting a bit "1" into the least significant bit position of the global branch history register 306 as shown in FIG. 4. BRLEZ instruction 416 again causes an update of the global branch history register 306 since it is a conditional branch instruction. Assuming that the BRLEZ instruction 416 is not taken, a bit "0" will be shifted into the global branch history register 306 at its least significant bit position. For the next instruction, branch greater than zero (BRGTZ) 418, global branch history register 306 will again be updated. Assuming that the branch greater than zero 418 is taken, a one will be shifted into the least significant bit position of the global branch history register 306.

A program may include multiple procedures. A procedure is a section of code within the program that is accessed upon execution of a "call" instruction. The call instruction may include an instruction that returns program execution to a next instruction after the call instruction. An example of a call instruction is a "branch with link" instruction that is further described with reference to the example program code provided below.

| PROGRAM CODE: |
|---|
| 0x001 ADD |
| 0x002 SUB |
| 0x003 BR |
| 0x004 BRNEZ |
| 0x005 MUL |
| 0x006 ADD |
| 0x007 BRANCH WITH LINK TO PROCEDURE 1 |
| 0x008 BRLEZ |
| 0x009 BRGTZ |
| 0x010 ADD |
| 0x011 BRANCH WITH LINK TO PROCEDURE 2 |
| 0x012 ADD |
| PROCEDURE 1 |
|    0x014 ADD |
|    0x015 SUB |
|    0x016 BREOZ |

-continued

| PROGRAM CODE: |
|---|
|    0x017 BRNEZ |
|    0x018 MUL |
|    0x019 DIV |
| END PROCEDURE 1 |
| 0x021 ADD |
| 0x022 MUL |
| PROCEDURE 2 |
|    0x024 SUB |
|    0x025 MUL |
|    0x026 ADD |
|    0x027 BREQZ |
|    0x028 MUL |
|    0x030 BRGTZ |
| END PROCEDURE 2 |

In the example program code above, 0xXXX represents the address at which an instruction is stored in instruction cache 102. A branch with link instruction is an instruction that transfers program execution to a particular procedure in the program code. Executing the branch with link instruction that transfers program execution to a procedure is referred to as "calling a procedure" herein. The branch with link instruction includes an instruction (not shown) that returns program execution to a next instruction after the branch with link instruction.

Global branch history such as that stored in global branch history register 306 is used as an index to access prediction entries in large branch history table 308 and small branch history table 310 becase branches often correlate with previously executed branches. Longer branch histories enable predictors to view a larger window of previously executed branches and learn based on correlations with those branches. For branches highly correlated with recent branch history, global history can provide key prediction information. Conventional branch predictors may rely only on a global branch history to produce branch predictions. However, not all branches in the program are correlated with recently executed branches. For these branches that are not correlated with recently executed branches, the extra information encoded in the global history may do more harm than good when predicting branches. It also increases the time to train the branch predictor and it significantly expands the level of aliasing in branch prediction tables, thereby reducing the accuracy of prediction of a current branch and of other branches. A longer global branch history register 306 enables correlation between more distant branches, but also increases the number of uncorrelated branches that are included in the branch history. Those uncorrelated branches can generate significant noise when predicting branches. Consider a 15-bit global branch history register 306. A branch that is highly correlated with 3 prior branches will make good use of a correlating predictor, but even in this scenario, the history contains 12 bits of useless noise. This means that in a worst case, $2^{12}$ times more entries may be needed to predict a branch, greatly increasing the training period of a branch predictor along with aliasing with other branches. For a branch uncorrelated with prior branches, the entire 15 bits are noise. Procedure calls often represent breaks in program flow. Branches preceding a procedure call tend to be less correlated with branches inside the procedure call. Accordingly, an architecture that allows some branches to benefit from large histories, but eliminates or reduces the history noise in those regions where the noise is not useful is provided.

To provide better prediction of branches using the global branch history register 306, a value in the global branch history register 306 is overwritten with a start address of a first instruction in a procedure when a branch to that procedure is made. Overwriting of a value in the global branch history register 306 with an address of a start address of the procedure that is called is referred to as "presetting" herein. If the branch to the procedure was speculative and incorrectly predicted, then the value in the global branch history register 306 that was overwritten is restored to the global branch history register 306. Using a start address of a first instruction in a procedure provides a unique history for each point at which the global branch history register 306 is preset, thereby eliminating aliasing between the different preset points in the program code, and ensuring that when program execution calls the procedure again, the global branch history register 306 will be preset to the same value. Since the global branch history register 306 is used as an index into the large branch history table 308 and the small branch history table 306 to determine direction of branches, presetting the global branch history register 306 to the same value (i.e. the start address of a first instruction in a procedure) ensures that branch predictions retrieved from the large branch history table 308 and the small branch history table 306 will be local to the procedure that is called and will be more accurate.

Figure 5:
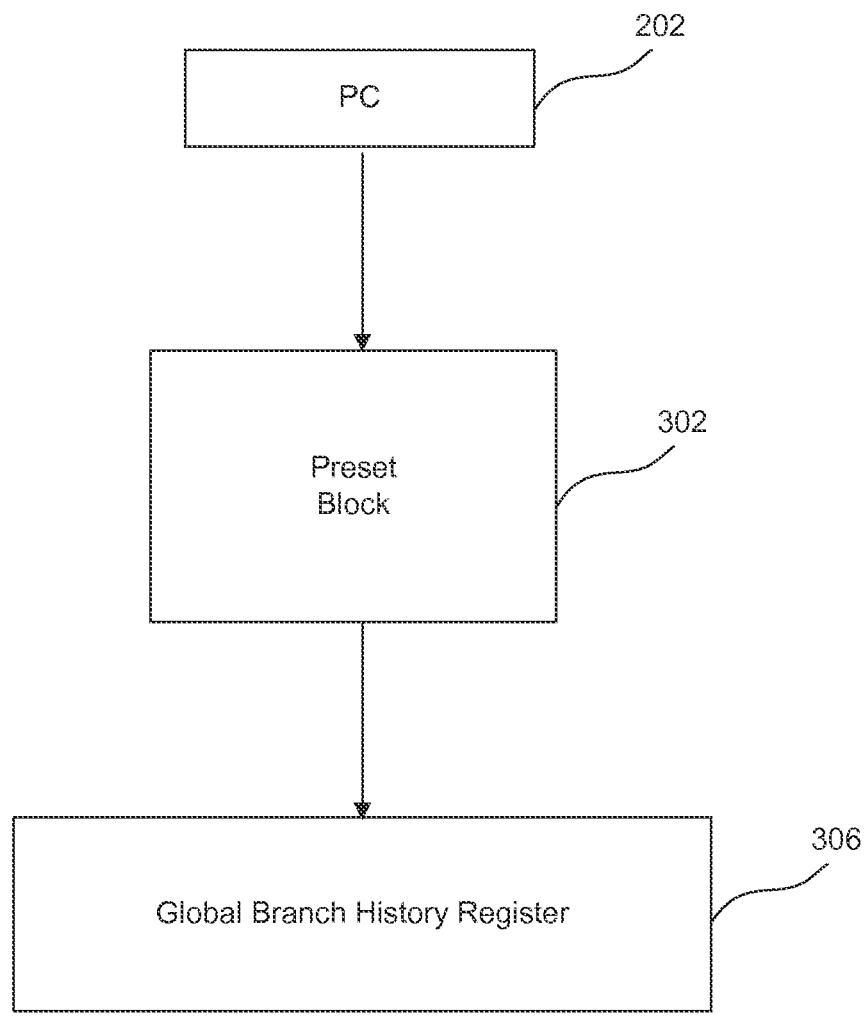
FIG. 5 illustrates presetting of the global branch history register according to an embodiment of the disclosure.

FIG. 5 illustrates presetting of the global branch history register 306 according to an embodiment of the disclosure. Preset block 302 is coupled to program counter 202 and global branch history register 306. When a branch with link instruction, such as branch with link to procedure 1, causes program execution to jump to procedure 1, preset block 302 overwrites a value in the global branch history register 306 to a start address for procedure 1. The start address for procedure 1 is the address for the first instructions in the procedure, for example, 0x014 in the program code above. The start address for the first instruction in procedure 1 may be accessed from, for example, the program counter 202. It is to be appreciated that the address for the start of a procedure may be received from sources other than program counter 202. Whenever a subsequent jump to procedure 1 is made, the value in the global branch history register 306 will be preset to 0x014. This will not only provide better correlation for the branches within procedure 1, it will also expedite training of the large branch history table 308 and the small branch history table 310. Similarly, whenever procedure 2 is called, the global branch history register 306 will be preset to the address of the first instruction in procedure 2, i.e., 0x024. Another benefit of presetting the global branch history register 306 upon procedure calls is that it allows for a sparser large branch history table 308 and small branch history table 310. This results in memory savings. Furthermore, a smaller hash of a value in the global branch history register 306 is needed when compared to conventional systems, to access entries in the large branch history table 308 as described below with respect to FIG. 6.

Figure 6:
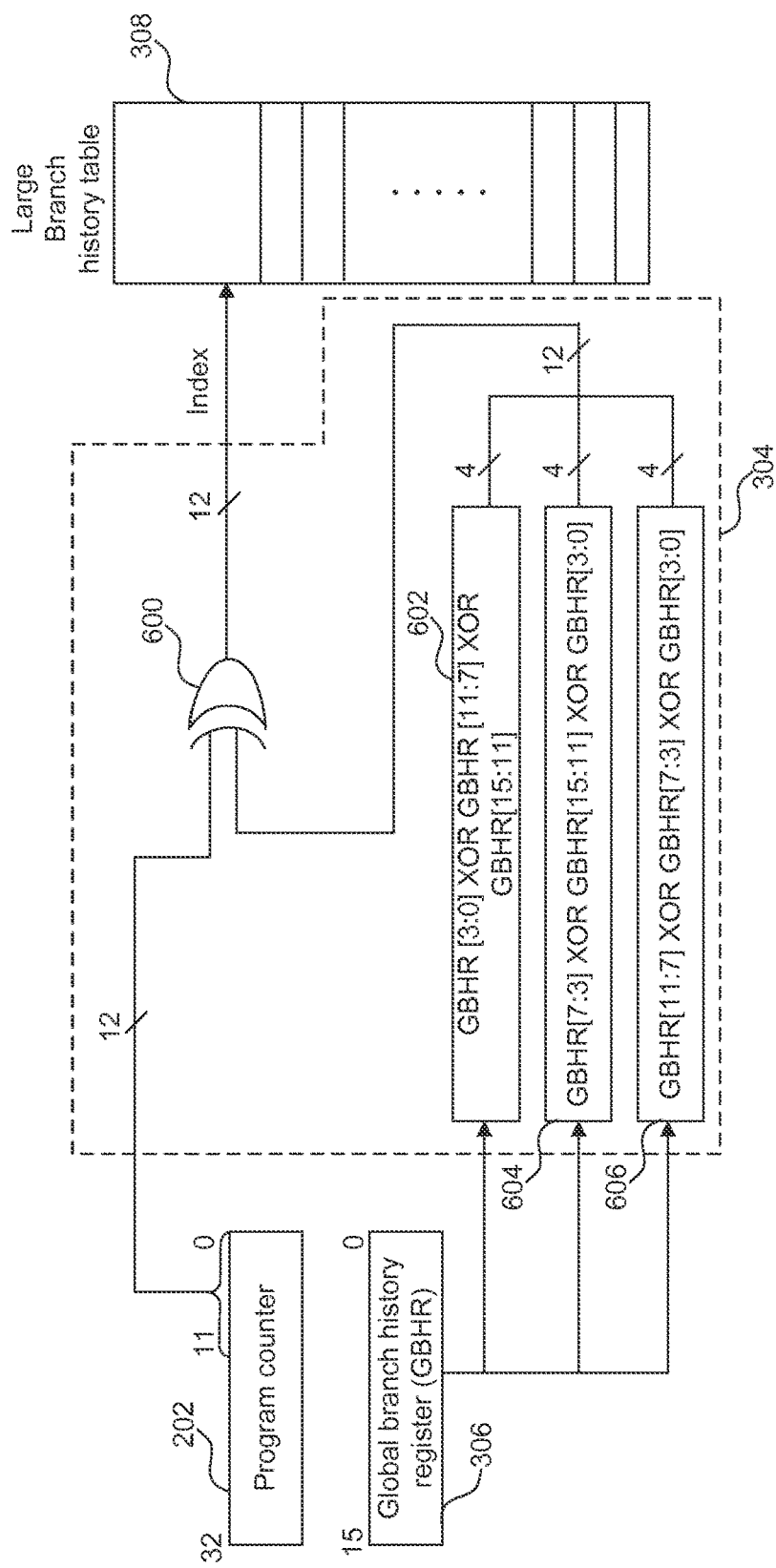
FIG. 6 illustrates an example system to provide an index to access an entry in large branch history table according to an embodiment of the disclosure.

FIG. 6 illustrates an example system to provide an index to access an entry in large branch history table 308 according to an embodiment of the disclosure.

In the example in FIG. 6, program counter 202 and global branch history register 306 are coupled to hash block 304. Hash block 304 is coupled to large branch history table 308 and provides an index to read or write entries in large branch history table 308. Hash block 304 includes XOR gate 600 and hash functions 602, 604 and 606. The value in global branch history register is 15 bits wide and is hashed down to 12 bits using the hash block 304. For example, hash functions 602, 604, and 606 hash a value in the global branch history register 306 from 15 bits down to 12 bits. The 12 least significant bits of program counter 202 are XORed with the 12 bit hash of the value in the global branch history register 306 using XOR gate 600 to produce a 12-bit index to access an entry in large branch history table 308.

Figure 7:
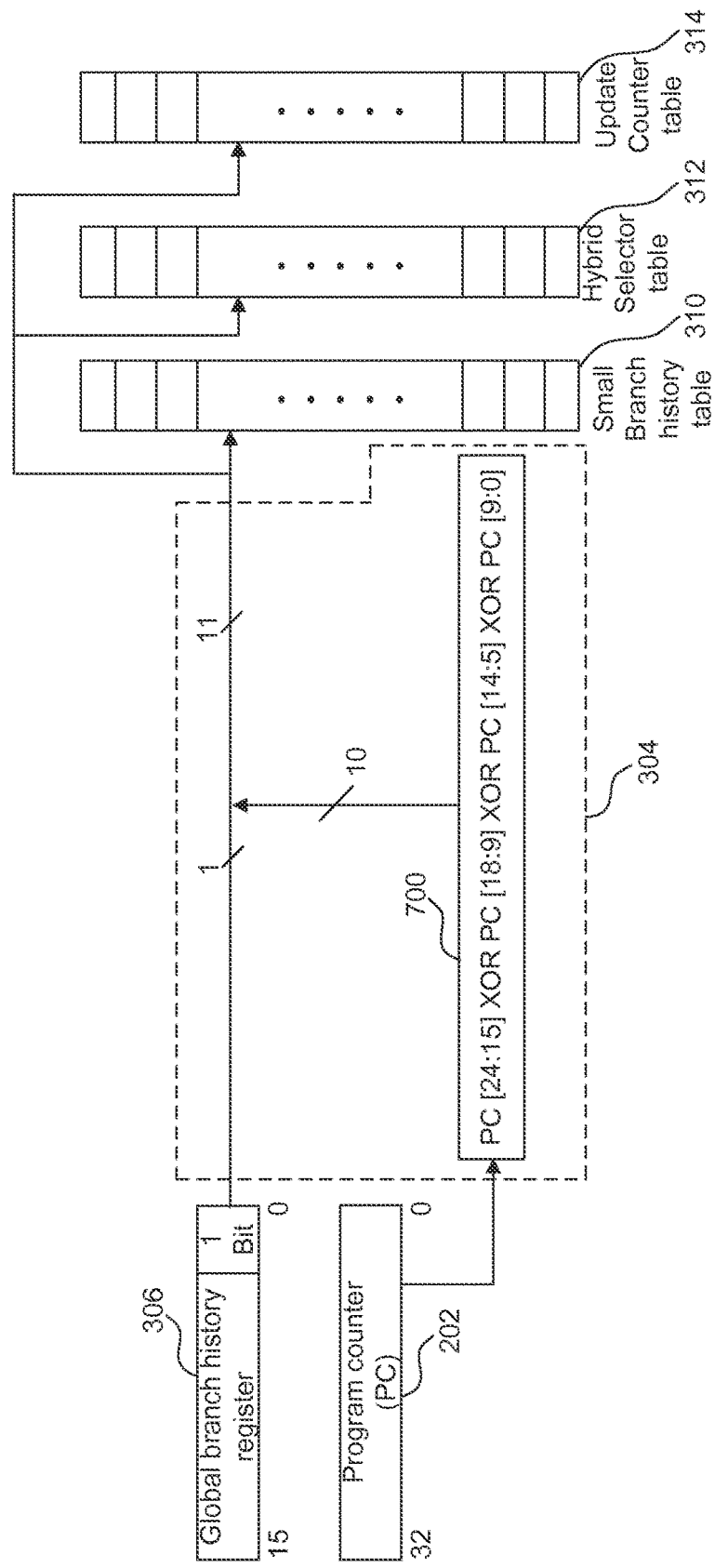
FIG. 7 illustrates a system to provide an index to access an entry in each of the small branch history table, the hybrid selector, and the update counter according to an embodiment of the disclosure.

FIG. 7 illustrates a system to provide an index to access an entry in each of the small branch history table 310, the hybrid selector 312, and the update counter 314 according to an embodiment of the disclosure.

Global branch history register 306 and program counter 202 are coupled to hash block 304. Hash block 304 is coupled to the small branch history table 310, the hybrid selector 312 and update counter 314. According to an embodiment of the disclosure, hash block 304 includes XOR function 700. XOR function 700 hashes a 32-bit program counter value in program counter 202 into a 10-bit value. The 10 bits generated by hash function 700 are combined with the least significant bit of the global branch history register 306 to form a 11-bit index. This 11-bit index is used to access an entry in the small branch history table 310, the hybrid selector 312, and the update counter 314.

Figure 8:
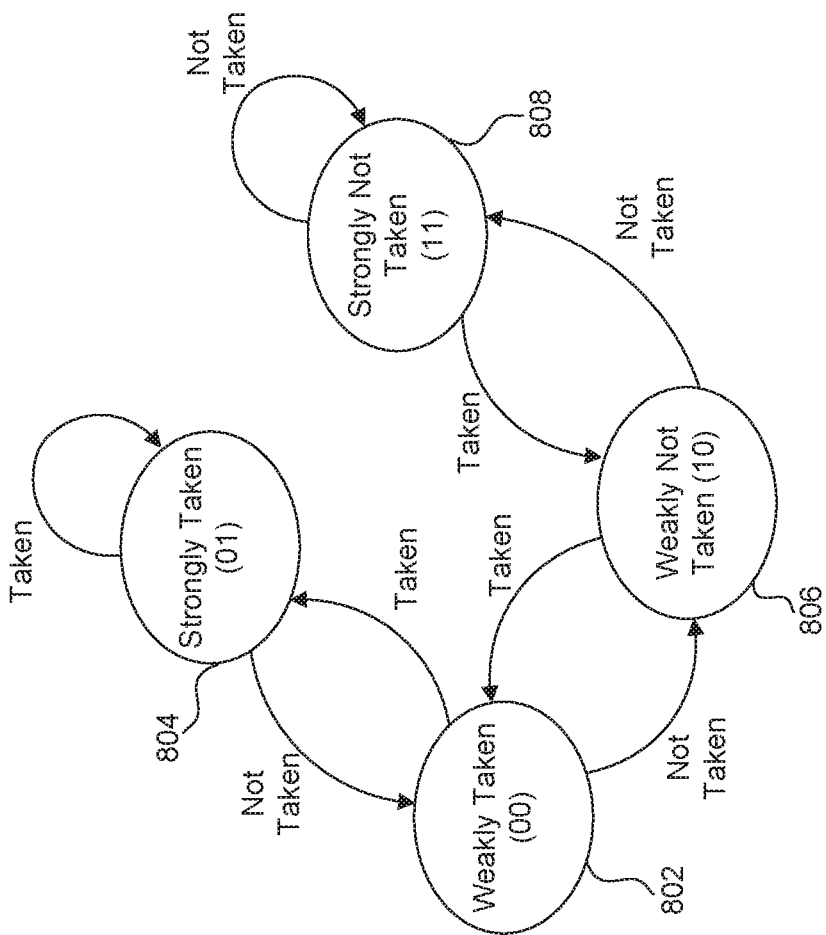
FIG. 8 illustrates an example state machine that is used to update branch prediction entries stored in the large branch history table and the small branch history table according to an embodiment of the disclosure The figures illustrate various components, their arrangements, and interconnections. Unless expressly stated to the contrary, the figures are not necessarily drawn to scale.

FIG. 8 illustrates an example state machine that is used to update branch prediction entries stored in the large branch history table 308 and the small branch history table 310 according to an embodiment of the disclosure.

During initialization, a random value may be stored in entries of the large branch history table 308 and the small branch history table 310. If a branch is taken the first time it is executed, the entry corresponding to the branch is associated with a "weakly taken" state 802 and is updated with bits 00. If the entry for a branch is currently in the weakly taken state 802, and if a next time the branch is executed it is taken again, then the entry is associated with the "strongly taken" state 804 and is updated with bits 01. If the current state for a branch is weakly taken state 802, then if the branch is not taken the next time it is executed, it transitions to the "weakly not taken state" 806 and the entry is updated with 10. If a branch is currently associated with the weakly not taken state 806 and it is taken the next time it is executed, then the state for that branch transitions to the weakly taken state 802 and its corresponding entry is updated with 00. If a branch is in the weakly not taken state 806, and then it is again not taken the next time it is executed, then the state transitions to a "strongly not taken" state 808 and the entry is updated with 11. If a branch is in a strongly not taken state 808, and then it is taken, then it transitions to the weakly not taken state 806 and the entry is updated with 10. If a branch is in the strongly taken state 804 and is then taken again the next time it is executed, then it will stay in the strongly taken state 804. If the branch is in the strongly taken state 804, and then it is not taken the next time it is executed, then it transitions to the weakly taken state 802 and the entry is updated with 00. If the branch is in the weakly not taken state 10 and then it is taken the next time it is executed, then it transitions to the weakly taken state 00.

Unspeculated Branch Instruction

Branch prediction unit 104 optimizes the frequent path that code takes through a set of branches. As described above, the branch prediction unit 104 determines which path a branch should take based on the global branch history register 306, large branch history register 308, and the small branch history 310. However, sometimes the most frequently taken path as learned by the branch prediction unit 104 isn't the path that a programmer may want to optimize. For example, a programmer may want to optimize a branch path that takes the most number of clock cycles to execute instead of a branch path that is most frequently taken. For example, consider the pseudo-code:

```
If (branch_instruction (branch condition))
    Execute code A
else
    Execute code B
```

In the above example, code A is the branch path whose execution takes the more number of clock cycles when compared to code B. The branch prediction unit 104 may determine based on the global branch history register 306, large branch history register 308, and the small branch history 310 that code B is the path of the branch that is taken most often. Thus, whenever branch prediction unit 104 encounters the branch instruction above, it will predict that code B should be executed instead of code A. However, when branch_instruction is later resolved by executing it in branch execution unit 118 and it is determined that code A was to be executed based on the branch condition above, penalty cycles will be incurred because code B, which was executed based on the prediction by branch prediction unit 104 that outputs branch direction signal 204, has to be invalidated and then code A will have to fetched and executed. Thus code A, that takes more number of clock cycles to execute than code B, will have additional cycles added to its execution due to the prior execution of code B based on the prediction by branch prediction unit 104. To avoid this scenario, embodiments presented herein provide for an unspeculated branch instruction called builtin_expect (branch condition). Pseudo-code for the builtin_expect instruction is provided below:

```
If (builtin_expect(branch condition))
    Execute code A
else
    Execute code B
```

According to an embodiment of the disclosure, the branch prediction unit 104 does not treat the builtin_expect unspeculated branch instruction like other branch instructions in that branch prediction unit 104 doesn't predict the branch direction by providing a branch direction signal 204 to determine whether code A or code B is to be executed. Instead, the builtin_expect instruction causes code A, which takes more clock cycles than code B to execute, to be executed every time. In an example, the instruction fetch unit (not shown) upon receiving the unspeculated branch instruction builtin_expect(branch condition) from the instruction cache 102 always fetches instructions for code A which is the branch path of the unspeculated branch instruction that takes more clock cycles to execute than code B. In an embodiment, code A is in the "forward path" of the unspeculated branch instruction. Forward path as referred to herein is the code that is the next sequential instruction after the unspeculated branch instruction. In an embodiment, a programmer or compiler may place code A in the forward path of the unspeculated branch instruction.

In addition, branch prediction unit 104 does not update any of the branch history tables such as global branch history register 306, large branch history register 308, and the small branch history 310 with the branch history of the builtin_expect instruction. Branch execution unit 118 later resolves the branch condition in builtin_expect(branch condition) to determine whether code A or code B was to be executed. If it is determined in branch execution unit 118 that code B should have been executed, then code B can be fetched, and the instructions executed in code A can be invalidated. While fetching instructions for code B, which may be the most frequent path taken, and invalidating instructions executed in code A will result in extra cycles, the worst case scenario of additional cycles required to execute code A will be avoided by use of the builtin_expect(branch condition) instruction.

Conclusion

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A method, comprising:
    providing a program to be executed in accordance with a speculative address;
    executing the program, the program comprising a procedure;
    setting bits in a taken branch history register to indicate whether a branch is taken or not taken during execution of instructions in the program;
    calling the procedure in the program; and
    overwriting, responsive to calling the procedure, contents of the taken branch history register to a start address for the procedure;
    accessing, using a hash block, a first branch history table based on contents of the taken branch history register for a first prediction of whether a current branch will be taken or not taken;
    accessing, using the hash block, a second branch history table based on the contents of the taken branch history register for a second prediction of whether the current branch will be taken or not taken; and determining whether the first prediction or the second prediction is used based on whether a selection value in a selection entry of a selector table is equal to or greater than a threshold value.

2. The method of claim 1, wherein accessing the first branch history table further comprises:

accessing the first branch history table based on the contents of the taken branch history register and a program counter register.

3. The method of claim 2, wherein accessing the first branch history table further comprises:

generating an index based on the contents of the taken branch history register and the program counter register to access an entry in the first branch history table, wherein the entry includes the first prediction.

4. The method of claim 3, wherein generating the index further comprises:

hashing the contents of the taken branch history register to produce a result having a number of bits that is less than a number of bits in the taken branch history register.

5. The method of claim 2, further comprising:

accessing the second branch history table based on the contents of the taken branch history register and the program counter register, wherein the first branch history table has more entries than the second branch history table.

6. The method of claim 5, wherein accessing the second branch history table further comprises:

generating an index based on the contents of the taken branch history register and the program counter register to access an entry in the second branch history table, wherein the entry includes the second prediction.

7. The method of claim 6, wherein generating the index further comprises:

hashing contents of the program counter register to produce a result having a number of bits that is less than a number of bits in the program counter register.

8. The method of claim 7, further comprising:

using the index to access the selection entry in the selection table.

9. The method of claim 6, further comprising:

using the index to access an update entry in an update table that stores an update value that indicates whether the first branch history table or the second branch history table is more accurate in a prediction of whether the branch will be taken, and suppressing updating a prediction value, corresponding to the branch, in the first branch history table based on the update value indicating that the second branch history table is more accurate than the first branch history table in the prediction of whether the branch is taken.

10. The method of claim 1, wherein the procedure comprises:

a section of code within the program that is accessed upon execution of a call instruction and has an instruction that returns program execution to a next instruction after the call instruction.

11. An apparatus, comprising:
an instruction cache; and
a branch prediction unit configured to supply a speculative address to the instruction cache, the branch prediction unit comprising:

a taken branch history register configured to store bits that indicate whether a branch is taken during execution of instructions in a program, wherein the program includes a procedure;

a preset circuit configured to overwrite contents of the taken branch history register to a start address for the procedure;

a first branch history table including a first prediction of whether a current branch will be taken or not taken;

a second branch history table including a second prediction of whether the current branch will be taken or not taken;

a selector table including a selection value in a selection entry; and a hash block configured to determine whether the first prediction or the second prediction is used based on whether the selection value is equal to or greater than a threshold value.

12. The apparatus of claim 11, wherein the hash block is further configured to access an entry in the first branch history table based on the contents of the taken branch history register and a program counter register.

13. The apparatus of claim 12, wherein the hash block is further configured to generate an index based on the contents of the taken branch history register and the program counter register to access the entry in the first branch history table, wherein the entry includes the first prediction.

14. The apparatus of claim 13, wherein the hash block is further configured to generate the index by hashing the contents of the taken branch history register to produce a result having a number of bits that is less than a number of bits in the taken branch history register.

15. The apparatus of claim 12, wherein the hash block is further configured to access the second branch history table based on the contents of the taken branch history register and the program counter register.

16. The apparatus of claim 15, wherein the hash block is further configured to generate an index based on the contents of the taken branch history register and the program counter register to access an entry in the second branch history table that includes the second prediction.

17. The apparatus of claim 16, wherein the hash block is further configured to generate the index by hashing contents of the program counter register to produce a result having a number of bits that is less than a number of bits in the program counter register.

18. The apparatus of claim 17, wherein the hash block is further configured to use the index to access an entry in the selection table.

19. The apparatus of claim 18, further comprising:
an update table, wherein the hash block is configured to access an update entry in an update table that stores an update value that indicates whether the first branch history table or the second branch history table is more accurate in a prediction of whether the current branch will be taken, and logic circuits configured to suppress an update of a prediction value, corresponding to the current branch, in the first branch history table based on the update value indicating that the second branch history table is more accurate than the first branch history table in the prediction of whether the current branch is taken.

20. The apparatus of claim 11, wherein the procedure comprises:

a section of code within the program that is accessed upon execution of a call instruction; and an instruction that returns program execution to a next instruction after the call instruction.

21. An apparatus, comprising:
a taken branch history register configured to store bits that indicate whether a branch is taken during execution of instructions in a program, wherein the program includes a procedure;
a preset circuit configured to overwrite contents of the taken branch history register to a start address for the procedure;
a first branch history table including a first prediction of whether a current branch will be taken or not taken;
a second branch history table including a second prediction of whether the current branch will be taken or not taken;
a selector table including a selection value in a selection entry; and
a hash block configured to determine whether the first prediction or the second prediction is used based on whether the selection value is equal to or greater than a threshold value.

* * * * *